United States Patent [19]

Robinson et al.

[11] Patent Number: 4,919,819
[45] Date of Patent: Apr. 24, 1990

[54] METHOD FOR REMOVING AND DECOMPOSING HYDROCARBON COMPOUNDS FROM WATER CONTAMINATED THEREWITH

[75] Inventors: Marguerite Robinson, Malvern; Manuel Holcomb, Carlisle, both of Ark.

[73] Assignee: Gem, Inc., Little Rock, Ark.

[21] Appl. No.: 307,536

[22] Filed: Feb. 6, 1989

Related U.S. Application Data

[63] Continuation-in-part of Ser. No. 227,192, Aug. 3, 1988, abandoned.

[51] Int. Cl.⁵ .......................... B01D 15/00; C02F 1/28
[52] U.S. Cl. ................................... 210/662; 210/671; 210/691; 423/556
[58] Field of Search .................. 210/662, 671, 691; 423/556

[56] References Cited

U.S. PATENT DOCUMENTS 4,076,615  2/1978  Olesen et al. ..................... 210/625
4,661,256  4/1987  Johnson ............................. 210/691

*Primary Examiner*—Ivars Cintins
*Attorney, Agent, or Firm*—Stephen D. Carver

[57] ABSTRACT

A method and apparatus for the removal and safe disposal of trace quantities of toxic or carcinogenic hydrocarbon compounds from waste water. As a result of this process, such hydrocarbon compounds are converted to less noxious, readily disposable compounds. The waste water is first admixed with rehydratable alumina to equilibrium, whereby hydrocarbon pollutant compounds are absorbed onto the surface of the rehydratable alumina. The compounds are then removed from the waste water by filtration, and the remaining water is safely drained off. The remaining rehydratable alumina containing the toxic compounds is then reactivated by heating for reuse in subsequent processing. Non-reusable alumina is digested in sulfuric acid to decompose any remaining toxic hydrocarbon comppounds to less noxious compounds and to convert the alumina to water-soluble and conveniently disposable aluminum sulfate. Concentrated hydrocarbon waste compounds may be converted to disposable wastes by mixing with alumina and digesting in a similar manner.

18 Claims, 1 Drawing Sheet

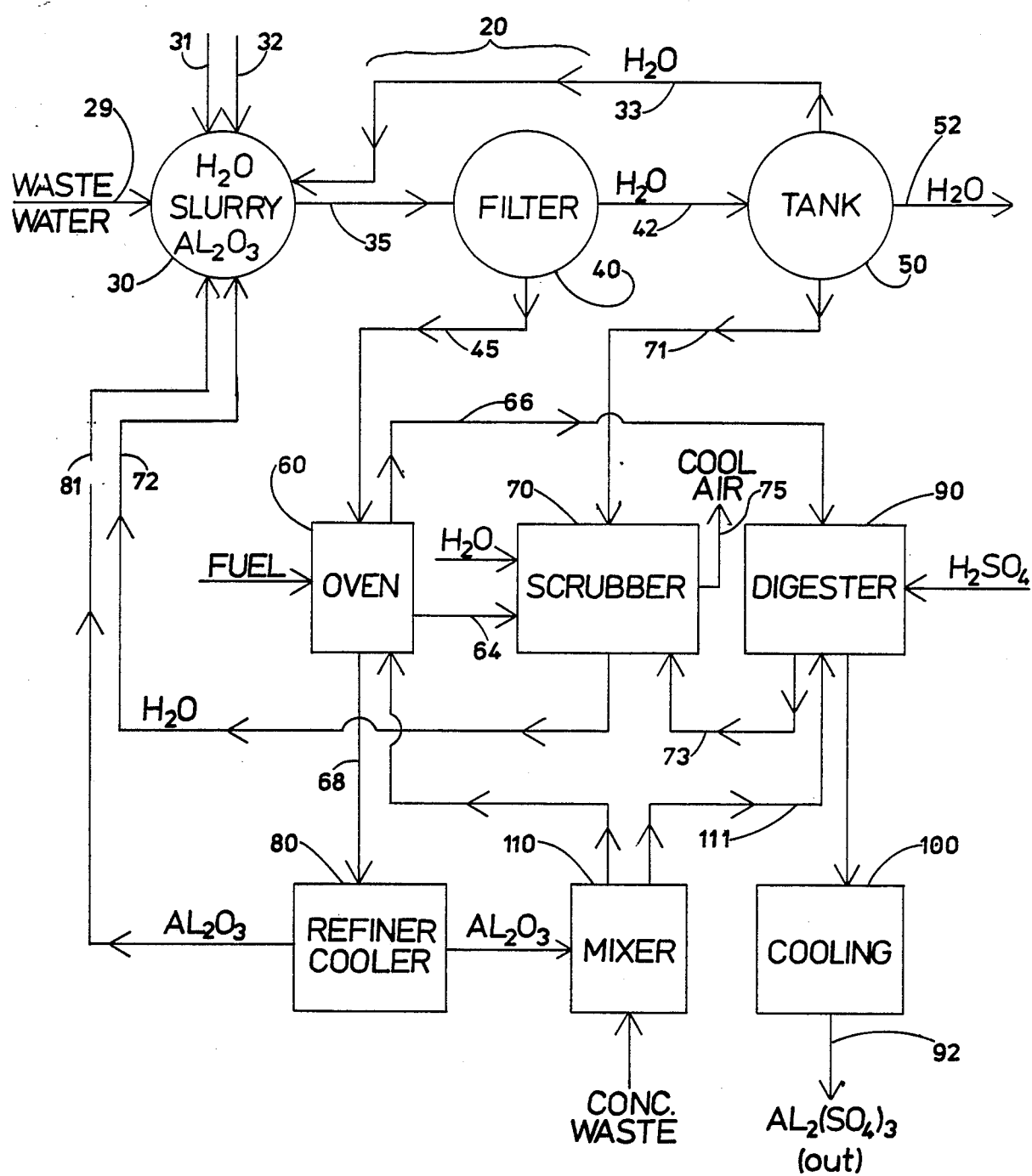

METHOD FOR REMOVING AND DECOMPOSING HYDROCARBON COMPOUNDS FROM WATER CONTAMINATED THEREWITH

CROSS-REFERENCE TO RELATED APPLICATION

This a continuation-in-part application based on our earlier filed and now abandoned application, Ser. No. 07/227,192, filed on Aug. 3, 1988 for METHOD FOR REMOVAL OF HYDROCARBON COMPOUNDS FROM WATER CONTAMINATED THEREWITH AND DECOMPOSING THEM, Group Art Unit 136; Examiner: I. Cintins, which is hereby incorporated by reference as if fully set forth herein.

BACKGROUND OF THE INVENTION

The present invention relates broadly to processes for the removal of trace quantities of hydrocarbon compounds from industrial waste water. More particularly, the present invention relates to a batch process for the treatment of waste water to remove trace quantities of hydrocarbon compounds such as halogenated hydrocarbons which are considered toxic or carcinogenic, and to decompose or convert such compounds to less noxious waste compounds. Moreover, the present invention relates to a process wherein an adsorbent is rendered free of organic matter and made water-soluble after it has lost its adsorptive ability.

As will be recognized by those skilled in the art, various processes of utilizing an adsorbent to remove hydrocarbon compounds from waste waters are known. Adsorbents suitable for such processes include silica gel, activated carbon, clays and activated alumina. However, one of the major concerns associated with the use of an inorganic adsorbent to remove hydrocarbon compounds which are considered toxic or carcinogenic is disposal of the adsorbent after it has lost its adsorptive ability. The solid remnants are considered a contaminated solid waste, and hence proper disposal in a difficult endeavor.

One related prior art waste water treatment method is disclosed by Oleson, U.S. Pat. No. 4,076,615, issued Feb. 28, 1978. The latter system treats waste water with an acidified carbon/alumina mixture followed by filtration of toxic solids and the aeration with an oxygenated gas stream. Although the '615 system may ultimately reduce the hydrocarbon compound content in waste water, no suggestion is provided therein as to the desirability of converting the solid waste products obtained from filtration into non-toxic, readily disposable, or marketable compounds. Oleson alternatively suggests treating the activated carbon/alumina product with sulfuric acid as a means of obtaining aluminum sulfate or alum, but teaches no efficient method of doing so. Moreover, the system suggested by Oleson requires multiple recycles, which can be expensive, cumbersome, and rather inefficient.

The more recent U.S. Pat. No. 4,661,256 issued to Johnson on Apr. 28, 1987 discloses a method for removing halogenated hydrocarbon compounds from waste water and subsequently hydrogenating the solutions with carrier materials such as alumina or silica and a selective metallic component. The Johnson system broadly suggests the need for neutralizing the recovered waste products and lists several possible adsorbents. The contaminated waste water is first channeled into a pressurized adsorption zone. The adsorbent is then regenerated employing an elution solvent in liquid or gas phase. The resulting product of regeneration is introduced into a hydrogenation zone for specified periods required to effectuate reduction of hydrocarbonaceous materials, and subsequently scrubbed with a basic scrubbing solution such as calcium hydroxide. The spent scrubbing solution must be neutralized before disposal, and it is suggested to recycle the recovered hydrocarbonaceous phase for cleansing in accordance with the disclosed system.

There is a steadily increasing demand for technology which not only eliminates trace quantities of hydrocarbon compounds from industrial waste waters, but which also eliminates and decomposes or converts them to non-hazardous compounds suitable for proper disposal. There is also a great demand for technology which is capable of destroying or decomposing the concentrated hydrocarbon waste materials which are separated from a water phase by other extractive methods, without releasing toxic gases or aqueous materials into the environment.

SUMMARY OF THE INVENTION

The present invention relates to a method for treating waste water to remove and reduce concentrations of highly toxic or carcinogenic hydrocarbon compounds, for decomposing them to non-toxic compounds, and for subsequently converting the selected adsorbent to a water-soluble compound whereby to eliminate problems associated with disposal of contaminated said waste products. Rehydratable alumina is cycled through several stages, until it is no longer suitable for purification, it is digested for disposal as aluminum sulfate.

Halogenated hydrocarbon compounds are suitable for treatment by the instant process. Certain halogenated hydrocarbons having demonstrated a potential toxicity include, but are not limited to, chlorinated biphenyls and halogenated cycladines, such as aldrin, endrin and dieldrin. Generally, any hydrocarbon compound exhibiting polar qualities such as phenol and toluene are suitable candidates for this process.

The method comprises the initial step of admixing an alumina adsorbent with the waste water to remove the trace quantities of water-borne hydrocarbons to provide a waste water containing greatly reduced quantities of the unwanted hydrocarbon compounds. The adsorbent is removed from the slurry water by filtration at equilibrium, which depends upon monitored hydrocarbon concentrations. Contaminated adsorbent from the latter steps is regenerated for reuse by heating in a reactivation oven. As long as water purity is maintained during sampling, regenerated alumina may be recycled back to the slurry tank. Gases liberated during alumina reactivation are carried into a combustion chamber for destruction. Gases from the combustion chamber are collected in solution in a liquid scrubber Liquids outputted from the scrubber may be returned to the slurry tank at the first stage of the process.

The spent adsorbent may contain trace amounts of toxic or carcinogenic hydrocarbon compounds entrapped within the solid, resulting in a contaminated solid waste to be disposed of through digestion. The spent adsorbent is treated with sulfuric acid at a high temperature and pressure digester wherein the hydrocarbon compounds are decomposed or converted to non hazardous compounds and the adsorbent is rendered free of organic matter and made water soluble. The spent alumina is outputted from the digestion phase as aluminum sulfate.

The invention also contemplates the disposal of concentrated hazardous hydrocarbon compounds separated by other extractive methods, which are treated by the digestion process described above. Such hydrocarbon waste materials are admixed with an alumina adsorbent to produce a moist cake. The cake material is then exposed to sulfuric acid at a high temperature and pressure, and the hydrocarbon compounds are decomposed or converted to non-toxic compounds. The alumina adsorbent is rendered free of organic matter and made water soluble, for disposal. The spent alumina adsorbent from the filtration process may be utilized, reducing the cost of the overall process. In the best mode known to us at this time, digestion may be accomplished at pressures of between 800–1000 PSI, at temperatures of 200–400 degrees C., within a sulfuric acid-water mixture of a 1:1 to 2:1 ratio.

The selected adsorbent for the present invention is rehydratable alumina (aluminum oxide) which is a partially calcined, very reactive alumina powder. Rehydratable alumina is an effective adsorbent and can be converted to aluminum sulfate by digesting in sulfuric acid. Solubility of aluminum sulfate in cold water is 31.3 grams per 100 cc's of water. Although pellet-type activated alumina might work equally as well in the process, the added cost of producing it and the energy requirements for digesting it in sulfuric acid would greatly increase the cost of the process.

While rehydratable alumina (aluminum oxide) is soluble in other mineral acids at a high temperature and pressure, due to and because of safety and economics, sulfuric acid is the preferred acid for the present invention. Sulfuric acid is the preferred acid for the purpose of this invention it being a very effective oxidizing agent and provides final conversion of rehydratable alumina (aluminum oxide) to potentially marketable aluminum sulfate.

Hence it is a fundamental object of the present invention to provide a method for safety and efficiently removing and disposing of trace quantities of toxic or carcinogenic hydrocarbon compounds from industrial wastes, such as waste water.

Another object is to provide a method for the destruction of hydrocarbon concentrated waste materials.

Another fundamental object of the present invention is to provide a method for decomposing toxic hydrocarbon compounds to convert them to non-toxic compounds for convenient disposal.

A further broad object of the method of the present invention is to ensure that no toxic or carcinogenic hydrocarbons are entrapped or retained in the solid waste products obtained by the present process, and thus eliminate the dangers inherent in the disposal of contaminated solid wastes.

Yet another object of the present invention is to provide an efficient method of waste water treatment whereby toxic hydrocarbon compounds are adsorbed from waste water samples with the use of rehydratable alumina (aluminum oxide).

A still further object of the present invention is to provide a waste water treatment method of the character described which is capable of efficiently and economically converting toxic hydrocarbon compounds extracted from waste water to non-toxic, safely disposable compounds.

Another object of the present invention is to provide a waste water treatment method of the character described which is adapted to convert resultant toxic hydrocarbon waste products to less harness composition through combustion and treatment with sulfuric acid at high temperatures and pressures.

Yet a further object of the present invention is to provide a waste water conversion method of the nature described which converts the spent adsorbent material to a non-toxic, potentially marketable product.

Another object is to provide apparatus suitable for accomplishing the method of the present invention.

These and other objects and advantages of the present invention, along with features of novelty appurtenant thereto, will appear or become apparent in the course of the following descriptive sections.

BRIEF DESCRIPTION OF THE DRAWING

The following drawing, which forms a part of the specification and which is to be construed in conjunction therewith, and in which like reference numerals have been employed throughout to indicate like parts, is a simplified block diagram, illustrating the major components and steps of our method.

DETAILED DESCRIPTION

With reference to the appended drawing, our method for removing and decomposing hydrocarbon compounds from water or other wastes is presented in block diagram form. The method is broadly designated by the reference numeral 20. System 20 may be characterized as a process for the removal and decomposition of trace quantities of toxic or carcinogenic hydrocarbon compounds from industrial waste water. Alternatively, it is adapted to purify other wastes.

Waste water in pipe 29 is inputted to slurry tank 30 and therein thoroughly admixed with rehydratable alumina ($Al_2O_3$). Alumina and fresh water may be delivered to tank 30 via pathways 31 and 32 respectively. Recycled water is admitted via line 33. Equilibrium is established, and hydrocarbon compounds are adsorbed on the surface of the rehydratable alumina. The slurry mixture may be directed to a filter 40 via a pipe 35 for separation.

Waste water from filter 40, which is relatively free of hydrocarbon compounds, is routed to drain tank 50 via pipe 42 for subsequent draining off or recycling to tank 30. During the process the quality of this water is constantly monitored. Clean water appears at 52 for return to the environment. The solid agglomeration of contaminated, rehydratable alumina exiting filter 40 is routed to natural gas reactivation oven 60 via conveyer means 45, and is reactivated at approximately 250–350 degrees Centigrade for one hour. Most of the toxic substances incineration in oven 60, and any remaining gases are cycled into a liquid scrubber unit 70 via line 64. Scrubber 70 also receives water from tank 50 via pipe 71. Also, it may receive feedback gas and volatiles from digester 90 if an overpressure occurs via a return line 73. Scrubber 70 returns water to slurry tank 30 via pipe 72.

Usable alumina remaining after reactivation may be delivered from oven 60 to refiner cooler 80 as illustrated by path 68. After air cooling, and as long as water in line 42 meets the desired purity, alumina may be recycled to slurry tank 30 as indicated by path 81.

When sampled water on line 42 falls beneath the desired purity standard, that water will be recycled to tank 30 via line 33, and fresh alumina will be used in the tank 30, rather than being recycled via refiner 80 and line 81. "Spent" alumina may then be routed from oven 60 through refiner 80 and mixer 110 into the high-pressure digester vessel 90 as indicated by illustrative path 111.

Digester 90 may receive heat along a line 66 from fluidized bed oven 60. It provides a sulfuric acid bath at a high temperature and pressure, nominally pressures of between 800 to 1000 PSI and temperatures of between 200 to 400 degrees C. Toxic or carcinogenic hydrocarbon compounds which may be entrapped in the spent rehydratable alumina are decomposed and converted to less hazardous compounds and driven off in the fluidized bed 60. The spent alumina is converted to aluminum sulphate. Other contaminants removed as gases are transferred to scrubber 70 on line 64, to insure that contaminates are not emitted to atmosphere. Water is returned on line 72 to slurry tank 30, and cool air may be vented to atmosphere out duct 75.

The conditions for digestion may vary. Preferably minimum conditions are considered to include a 1:1 concentration of sulfuric acid and water. A liquid-solid ratio going to digestion of between 8:1 to 15:1 by weight is nominal, with a 10:1 ratio being best. A minimum temperature of 225 degrees Centigrade and a digestion time of four hours is preferred. In the best mode, digester pressure is between 800 to 1000 PSI. As will be appreciated, changes in conditions of digestion, such as temperature or concentration of acid will result in changes in pressure inside the closed digestion vessel 90. Aluminum sulfate outputted by digester 90 is then cooled in cooling unit 100, and disposable aluminum sulfate appears at path 92.

Alternatively, where desirable, dry aluminum oxide and waste mixtures may be passed through mixer 110 directly from filter 40 into the digester unit 90 without passing through oven 60. Gases and volatiles remaining after digestion may be subsequently passed into the liquid scrubber unit 70, while remaining aluminum sulfate is cooled and released from the system via cooling unit 100. The scrubbing solution will be neutralized or otherwise treated to provide a more environmentally acceptable effluent, and as illustrated, it may be returned to the slurry tank 30 for this purpose.

In the preferred embodiment, both slurry tank 30 and drain tank 50 comprise polyethylene 53-gallon tanks, such as McMaster-Carr Model No. 4158Y45, provided with a spigot and suitable cover, such as Model No. 4158T55. The preferred mixer unit associated therewith is a McMaster-Carr one-third horsepower Electric Mixer, Model No. 3492K61. The filtration unit 40 preferably comprises a McMaster-Carr Model No. 4405K11 having a ten-micron element, identified as Model No. 4405K14. The preferred oven 60 comprises a York-Shipley brand fluidized bed burner with an oxygen-rich gas-fired afterburner. A multi-zone water screen and venturi tube produced by American Air Filter comprises the preferred scrubber unit 70. Preferably refiner cooler 80 comprises a Sprout-Waldron five-horsepower hammer mill operatively associated with a standard Carrier three-ton air conditioner unit. The final cooling unit 100 preferably comprises a water-cooled mold such as that produced by Loma Machine Manufacturing Company. Mixer 110 comprises a Curtis shaker mixer Model No. 3467K4. The foregoing system components are readily available for sale to the public and it is thus believed unnecessary to address their particular structures or operational features herein.

The digester vessel 90 preferably used with the present method comprises a heatable pressure vessel to be heated to 200-400 degrees C. (preferably 225 degrees C.), to best withstand a pressure of 1000 PSI and the corrosive effects of 1:1 and 2:1 sulfuric acid. The size of the vessel will vary depending upon the quantity of waste to be destroyed. Heat may be furnished by any available source, but must have automatic temperature control. The vessel must be equipped with a rupture disc and a containment tank of sufficient size to receive contents of the pressure vessel in case the rupture disc pressure is exceeded.

The following examples are merely illustrative and not intended to be construed as limiting the application of the present method.

EXAMPLE I

A sample of waste water was obtained from Jacksonville, Arkansas, and analyzed for hydrocarbon compounds. The water was admixed with rehydratable alumina in a ratio of alumina to water of 1:75 and slurried for thirty minutes. The alumina was removed from the water by filtration. With reference to Table 1, ten parts per million (ppm) of Toluene in the feed water was reduced to less than 0.001 ppm in the filtrate; five ppm of Cholorophenol was reduced to less than 0.001 ppm in the filtrate; and 1 ppm of 2,4-D was reduced to less than 0.001 ppm in the filtrate.

The rehydratable alumina was digested in 1:1 sulfuric acid for four hours at 225-degrees Centigrade. The aluminum sulfate produced by the reaction of alumina with sulfuric acid was dissolved in water. An extraction was made with hexane and analyzed. No trace of toluene, chlorophenol, or 2,4-D was detected.

TABLE 1

| | Concentration PPM | | |
| --- | --- | --- | --- |
| | Toluene | Chlorophenol | 2,4-D |
| Feed Water | 10 | 5 | 1 |
| Filtrate | <0.001 | <0.001 | <0.001 |

EXAMPLE II

A sample of waste water was obtained from a holding pond in Malvern, Arkansas. The water contained 102 ppm phenol. The water was admixed with rehydratable alumina in a ratio of twenty-two pounds alumina to 1000-gallons water and slurried for five minutes. The alumina was removed by filtration, and treated as follows:

(i) The rehydratable alumina was placed in an oven for reactivation at 350-degrees C. for one hour;

(ii) An extraction on the filtrate was made with hexane and analyzed. The phenol concentration was reduced to 14-ppm;

(iii) The reactivated alumina from step (i) was admixed with the water containing 102-ppm phenol in a ratio of 22-pounds alumina to 1000-gallons of water, and slurried for 5 minutes. The alumina was removed by filtration;

(iv) An extraction on the filtrate was made with hexane and analyzed. The phenol concentration was reduced to 15-ppm;

(v) The alumina from step (iii) was digested in 1:1 sulfuric acid for four hours at 225-degrees C. The aluminum sulfate produced by the reaction of alumina with sulfuric acid was dissolved in water. An extraction was made with hexane and analyzed. No trace of phenol was detected.

EXAMPLE III

A synthetic waste water sample was prepared in the laboratory containing five ppm aldrin, five ppm endrin, and five ppm dieldrin. The sample water was admixed with rehydratable alumina in a ratio of one part alumina to 200 parts water and slurried for thirty minutes. The alumina was removed by filtration. As illustrated in Table 2, filtration resulted in a reduction of aldrin, endrin, and dieldrin concentrations to less than 0.001 ppm.

TABLE 2

|  | Concentration PPM | | |
|---|---|---|---|
|  | Aldrin | Endrin | Dieldrin |
| Feed Water | 5 | 5 | 5 |
| Filtrate | <0.001 | 0.001 | 0.001 |

Subsequently, the alumina was digested in 1:1 sulfuric acid at 225-degrees Centigrade for four hours. The aluminum sulfate produced by the reaction of alumina with sulfuric acid was dissolved in water. The results obtained, illustrated in Table 3, indicate that the concentration of aldrin was reduced by digestion to less than 0.001 ppm, the concentration of endrin to 0.61 ppm, and the concentration of dieldrin to 0.13-ppm.

TABLE 3

| Results Obtained after Digestion in Example III | | | |
|---|---|---|---|
|  | Concentration PPM | | |
|  | Aldrin | Endrin | Dieldrin |
| Before Digestion | 5 | 5 | 5 |
| After Digestion | 0.001 | 0.61 | 0.13 |

In the above example aldrin was decomposed under the minimum conditions set for digestion. However, these conditions were not adequate for the complete destruction of endrin and dieldrin. Different digestion conditions for endrin and dieldrin were applied in the following example.

EXAMPLE IV

One gram of rehydratable alumina with 200-ppm endrin and 200-ppm dieldrin adsorbed on its surface was digested in 10 ml. of 2:1 sulfuric acid at 250 degrees C. for five and one half hours. The test was run four times. The aluminum sulfate produced by the reaction of alumina with sulfuric acid was dissolved in water. An extraction was made with hexane and analyzed. As illustrated in Table 4, digestion resulted in a reduction of concentrations to less than 0.001-ppm.

TABLE 4

|  | Concentration PPM | | | |
|---|---|---|---|---|
|  | ENDRIN | | DIELDRIN | |
| Test No. | Before Digestion | After Digestion | Before Digestion | After Digestion |
| 1 | 200 | <0.001 | 200 | <0.001 |
| 2 | 200 | <0.001 | 200 | <0.001 |
| 3 | 200 | <0.001 | 200 | <0.001 |
| 4 | 200 | <0.001 | 200 | <0.001 |

EXAMPLE V

One gram of rehydratable alumina with 200 ppm heptoclor and 200 ppm lindane adsorbed on its surface was digested in 10 milliliters of 2:1 sulfuric acid at 250 degrees C. for 5.5 hours. The aluminum sulfate produced by the reaction of alumina with Sulfuric acid was dissolved in water. An extraction was made with hexane and analyzed, with the results of Table 5.

TABLE 5

|  | Concentration PPM | |
|---|---|---|
|  | Heptoclor | Lindane |
| Before Digestion | 200 | 200 |
| After Digestion | <.001 | <.001 |

All analyses were performed on a gas chromatograph using an electron capture detector with a sensitivity of one part per billion (1 ppb). GC/MS analyses on breakdown products from Examples IV and V showed only trace amounts of carboxylic acids remaining.

From the foregoing, it will be seen that this invention is one well adapted to obtain all the ends and objects herein set forth, together with other advantages which are inherent to the structure.

It will be understood that certain features and subcombinations are of utility and may be employed without reference in other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A purification process for removing toxic hydrocarbon compounds from waste water, said process comprising the steps of:
    (a) creating s slurry mixture from rehydratable alumina and a predetermined quantity of said waste water causing said hydrocarbon compounds to be adsorbed on the surface of said alumina;
    (b) after adsorption, filtering the slurry mixture of step (a) to yield treated water and contaminated alumina;
    (c) monitoring the quality of said treated water;
    (d) subjecting said contaminated alumina to a high-temperature oven to recover recyclable alumina while concurrently separating and substantially incinerating waste gases;
    (e) scrubbing all waste gases remaining after said step (d);
    (f) when said water monitored in accordance with step (c) achieves a desired predetermined purity, returning said recyclable alumina of step (d) for slurrying in accordance with step (a); and,
    (g) when water monitored in accordance with step (c) fails to achieve said desired predetermined purity, digesting the alumina outputted by step (d) to yield a disposable aluminum compound.

2. The process as defined in claim 1 wherein said steps (f) and (g) each comprise the step of cooling the alumina.

3. The process as defined in claim 2 wherein water from step (b) is recycled to the slurry mixture of step (a).

4. The process as defined in claim 1 wherein gases liberated during said digestion step (g) are delivered to the scrubber of step (e).

5. The process as defined in claim 1 wherein said digesting step (g) comprises the step of subjecting spent alumina to a high pressure bath of sulfuric acid.

6. The process as defined in claim 5 wherein digestion occurs between 200–400 degrees C., at a pressure of between 800–1000 PSI.

7. The process as defined in claim 6 wherein digestion occurs at approximately 250 degrees C. and at approximately 850 PSI.

8. The process as defined in claim 6 wherein digestion occurs at a liquid solid ratio of between 8:1 and 15:1 by weight.

9. The process as defined in claim 8 wherein the liquid-solid ratio of water and alumina in said slurry step (a) is approximately 200:1 by weight.

10. A purification process for removing toxic hydrocarbon compounds from waste water, said process comprising the steps of:
  (a) creating a slurry mixture from rehydratable alumina and a predetermined quantity of said waste water causing said hydrocarbon compounds to be adsorbed on the surface of said alumina;
  (b) after adsorption, filtering the slurry mixture of step (a) to yield treated water and contaminated alumina;
  (c) monitoring the quality of said treated water;
  (d) subjecting said contaminated alumina to a high-temperature oven to recover recyclable alumina while concurrently separating and substantially incinerating waste gases;
  (e) scrubbing all waste gases remaining after said step (d);
  (f) when water monitored in accordance with step (c) achieves a desired predetermined purity, returning said recyclable alumina of step (d) for slurrying in accordance with step (a); and
  (g) when water monitored in accordance with step (c) fails to achieve said predetermined purity, digesting the alumina outputted by step (d) with sulfuric acid to yield disposable aluminum sulfate, said digesting step performed between 200–400 degrees C., at a pressure of between 800 and 1000 PSI.

11. The process as defined in claim 10 wherein digestion occurs at approximately 250 degrees C. at approximately 850 PSI.

12. The process as defined in claim 10 wherein digestion occurs at a liquid solid ratio of between 8:1 and 15:1 by weight.

13. The process as defined in claim 12 wherein the liquid-solid ratio of water and alumina in said slurry step (a) is approximately 200:1 by weight.

14. The process as defined in claim 12 wherein said steps (f) and (g) each comprises the step of cooling the alumina.

15. The process as defined in claim 14 wherein gases liberated during said digestion step are delivered to the scrubber of step (e).

16. The process as defined in claim 15 wherein treated water from step (b) is recycled to the slurry of step (a).

17. A process for converting concentrated contaminated toxic hydrocarbon compounds which have been separated from a watse phase by other extractive methods to non-hazardous waste, said process comprising the steps of:
  (a) mixing a predetermined quantity of said contaminated hydrocarbon compounds with rehydratable alumina in a mixer;
  (b) chemically treating the mixture produced by step (a) in a high temperature and pressure digester wherein the hydrocarbon compounds are decomposed and converted to non-toxic compounds in a pressure bath of sulfuric acid at a temperature of 200–400 degrees C., and at a pressure of between 800–1000 PSI.

18. The process as defined in claim 17 wherein digestion occurs at approximately 250 degrees C. at approximately 850 PSI.

* * * * *